Patented Nov. 6, 1973

3,770,698
PHENOL TERMINATED CARBOXY CONTAINING DIENE ELASTOMERS
Changkiu K. Riew, 2136 Stabler Road, Akron, Ohio 44313
No Drawing. Filed Dec. 17, 1971, Ser. No. 209,417
Int. Cl. C08d 5/02; C08g 30/12
U.S. Cl. 260—47 UP                    9 Claims

ABSTRACT OF THE DISCLOSURE

Phenol terminated elastomers are prepared by reacting carboxyl terminated polymers of dienes with diphenols such as bisphenol A, so that the carboxyl groups become part of the molecular chain and phenolic hydroxyls become end groups. Very small proportions of the phenol terminated elastomers added to epoxy resin compositions such as those based on the diglycidyl ether of bisphenol A produce a very great increase in resistance to impact.

CROSS REFERENCES TO RELATED APPLICATIONS

Epoxy resin compositions containing the elastomers of this invention are disclosed in the application for patent of Riew, Siebert & Rowe, entitled "Epoxy Resin Plastics," Ser. No. 210,156, filed Dec. 20, 1971.

BACKGROUND OF THE INVENTION

Carboxyl terminated elastomers are known and have been used for various purposes including the flexibilization of plastics such as epoxy resins. Such elastomers are described in the Siebert Pat. No. 3,285,949. These elastomers differ from true plasticizers in not being dissolved in the plastic material but instead forming a separate disperse phase having more or less fluent properties. However, significant improvement in properties of plastics has generally required use of substantial quantities of flexibilizers which notably reduce strength and modulus of the plastic products.

SUMMARY OF THE INVENTION

I have prepared a new class of elastomers which have been found to impart remarkable improvement in resistance to impact when used in very small proportions in hard and otherwise brittle epoxy resin plastics, without significantly changing the hardness or modulus of elasticity of the products.

This class of elastomers may be designated as phenol-terminated liquid rubbers. They are easily prepared by reacting the previously known carboxyl terminated rubbers with diphenols so that the product consists of a fairly long chain elastomeric polymer terminated at one end, and preferably at both ends, in a phenolic hydroxy group.

The backbone of the elastomer is preferably a diene polymer or copolymer, particularly a liquid polymer of butadiene, alone or with minor proportions of copolymerizable monomers such as styrene, acrylonitrile, or ethyl acrylate. Carboxyl terminated liquid rubbers are commercially available, and can be made by various procedures, such as that disclosed in the Siebert U.S. patent already mentioned. In addition to polymers of butadiene, analogous polymers can be made from isoprene, chlorobutadiene, or other raw materials, by conventional techniques, and be terminated by carboxyl groups, for use as the starting material of this invention.

The diphenol, which is the other reagent, may be any of a great number of compounds containing two phenolic hydroxyl groups, such as hydroquinone, resorcinol, dihydroxy biphenyl, dihydroxy diphenylmethane, dihydroxy diphenyl dimethyl methane (bisphenol A), the various dihydroxy naphthalenes, and the like. Substituent groups which are more reactive toward epoxy groups than the phenolic hydroxyl groups should be absent.

The phenol terminated elastomers may be prepared by simply heating a carboxyl terminated elastomer with a diphenol in the presence of an acid or other suitable catalyst, or by preliminary conversion of carboxyl to a more reactive group such as acid chloride followed by reaction with a diphenol. An excess of the diphenol is preferably present to minimize linkage of the elastomer chain molecules to each other. The excess diphenol can then be removed if desired, or can be retained for future reaction with epoxy compounds or other ingredients of a plastics composition.

The new phenol terminated elastomers have been found to have the unique property of imparting greatly improved resistance to impact to plastics which otherwise tend to be objectionably brittle. This extremely important benefit is obtained with very small quantities of added elastomer, which appears to be far less than could be predicted to be required from any previous knowledge. Moreover, the essential properties of strength and rigidity are not noticeably changed by the small additions required for this purpose.

However, larger proportions of phenol terminated elastomers may be used to flexibilize epoxy resins or other plastics if maximum rigidity is not required.

While a full explanation of the reasons for the "flexibilizing" or toughening effect of these new materials is not available, it has been observed that they appear to be taken up into solution by common plastics such as epoxy resins when mixed, and to separate as minute more or less spherical domains of a separate disperse phase during the chain extension and ultimate cross linking as the resin sets and hardens. The phenol terminal groups are thought to have the correct reactivity to bond to the thermosetting matrix of resin during the final stages of the cross linking of the resin, without essential reduction of elasticity of the elastomeric polymer chain in these minute elastomer domains.

Example 1

A carboxyl terminated copolymer of butadiene about 82% and acrylonitrile about 18%, of average molecular weight about 3200, is prepared using azo dicyanovaleric acid initiator as described in Siebert U.S. Pat. No. 3,285,949. This is a commercial material sold under the name Hycar CTBN and will be designated as CTBN.

3000 parts by weight of CTBN are mixed with 260 parts thionyl chloride (somewhat over two molar equivalents based on the CTBN, for reaction with the two terminal carboxyl groups of the CTBN). Sulfur dioxide is evolved immediately. Examination of the infrared absorption spectrum shows disappearance of the carboxyl carbonyl bands previously observed in CTBN and appearance of an acid chloride carbonyl absorption band, indicating complete conversion of the carboxyl groups to acid chloride groups. Unreacted thionyl chloride and unvented sulfur dioxide are removed by warming to 50° C. and applying a vacuum. The intermediate product is mixed with 500 parts bisphenol A (an equimolar proportion with respect to the thionyl chloride used). Hydrogen chloride is evolved, and after the reaction is apparently terminated, a vacuum is applied for removal of remaining hydrogen chloride. The infrared spectrum shows disappearance of the acid chloride band and appearance of a new carbonyl band characteristic of a phenol ester.

The product consists of the original rubber backbone with each terminal carboxyl group esterified by one of the phenolic hydroxyl groups of the bisphenol A and the other phenolic hydroxyl being the new terminal group. It is accordingly a phenol terminated elastomer.

An epoxy resin composition is prepared by mixing 100 parts by weight of liquid diglycidyl ether of bisphenol A of average molecular weight 380 with 24 parts bisphenol A and 5 parts of the phenol terminated elastomer described above. The mixing is carried out at a temperature of 120 to 150° C. while the mixture is subjected to a vacuum to remove bubbles. After cooling to below 50° C., 5 parts of piperidine are carefully mixed in without introducing air bubbles. The mix is cast in a tray lined with polytetrafluoro-ethylene, preheated to 80° C., with brief application of a vacuum if needed for removal of bubbles. The composition is cured 16 hours at 120° C., in an oven. The cured product is subjected to the fracture energy test described by Rowe, Siebert & Drake in "Toughening Thermosets With Liquid Butadiene/Acrylonitrile Polymers," Modern Plastics, vol. 47, No. 8, p. 110, August 1970. An average value of fracture energy of 44 inch pounds per square inch is found, indicating an extermely tough and resistant product. A similar product without the phenol terminated elastomer has essentially the same strength, hardness and modulus, but a fracture energy of only about 2 inch pounds per square inch and is quite brittle.

Example 2

A phenol terminated rubber is prepared by reacting CTBN with a large excess of bisphenol A and a small amount of p-toluenesulfonic acid. Thus, 1000 parts CTBN are mixed with 300 parts bisphenol A (over 4 molar equivalents based on the CTBN) and one-half part of p-toluenesulfonic acid dissolved in acetone, and heated to 150° C. for two hours. The product when titrated with alcoholic potash shows a reduction of acidity from a value equivalent to 2.70% COOH in the original CTBN to a much smaller value equivalent to 0.74% COOH. The infrared spectrum shows a carbonyl absorption band shifted from the previous carboxl carbonyl band. Since the terminal carboxyl groups in CTBN originate from the azo dicyanovaleric acid initiator which has the cyano group on the third carbon from the carboxyl carbon, it is believed that the cyano and carboxyl groups combine to form a six-membered glutarimide ring with which the bisphenol A forms an adduct, leaving the second phenolic hydroxyl of the bisphenol A as a new terminal group.

The excess bisphenol A does not need to be removed, as it is a normal constituent of epox resin compositions. Accordingly, the reaction product just described is incorporated into an epoxy composition in the manner described in Example 1. Fracture energy is found to be an average of 55 inch pounds per square inch.

Example 3

Epoxy resin compositions are prepared in the manner described above, but without the bisphenol A. Thus, 100 parts by weight of liquid diglycidyl ether of bisphenol A are mixed with 5 parts of one of the following liquid rubbers and 5 parts piperidine, and cured in a tray. The products exhibit the following properties:

| Liquid rubber: | Fracture energy |
| --- | --- |
| Hycar 1312 (copolymer: butadiene, acrylonitrile) | 1–2 |
| Hycar CTBN | 10–16 |
| Hycar CTBN (hydroxy ethyl ester of CTBN) | 5–14 |
| Phenol terminated rubber of Ex. 1 | 14–16 |
| Phenol terminated rubber of Ex. 2 | 15–20 |

It is apparent that the rubber without functional end groups is ineffective in removing the brittleness of the epoxy resin product. The prior art carboxyl terminated CTBN produces a greatly improved product which has a high fracture energy and strongly resists crack growth. The hydroxyl terminated derivative of CTBN containing aliphatic or alcohol hdroxyls results in less improvement than the carboxyl terminated CTBN. On the other hand, the phenol terminated rubbers of this invention produce a greater average improvement than any other materials tested.

These new elastomers can be used for any of the purposes for which rubber is ordinarily used, since they are vulcanizable with sulfur or other curing agents. In addition, they can also be cross linked by reaction with the functional terminal groups if desired, using the known agents suitable for such purposes, such as poly-epoxides, poly-isocyanates, and the like. Thus, they are suitable for making molded rubber goods, adhesives, sealants, and potting compounds.

I claim:

1. A phenol terminated elastomer which is the product of a reaction of a diphenol with a carboxyl terminated diene polymer or copolymer elastomer in proportions of a molar excess of diphenol over the carboxyl equivalent of the elastomer, in which reaction one phenolic hydroxyl of the diphenol becomes united to each carboxyl of the elastomer and the other phenolic hydroxyl becomes the end of the elastomer molecule.

2. A phenol terminated elastomer as in claim 1, in which the carboxyl terminated elastomer is carboxyl terminated at both ends and each end group is converted to a phenol group.

3. A phenol terminated elastomer as in claim 2, in which the carboxyl terminated elastomer is a carboxyl terminated polymer chain made up primarily of diene links.

4. A phenol terminated elastomer as in claim 3, in which the carboxyl terminated elastomer is a liquid polymer.

5. A phenol terminated elastomer as in claim 4, in which the carboxyl terminated elastomer is made up primarily of butadiene links.

6. A phenol terminated elastomer as in claim 5, in which the carboxyl terminated elastomer is a copolymer of a major proportion of butadiene and a minor proportion of acrylonitrile.

7. A phenol terminated elastomer as in claim 6, in which the diphenol is bisphenol A.

8. A phenol terminated elastomer as in claim 7, in which the reaction is esterification of each carboxyl group with one phenolic hydroxyl of a molecule of diphenol.

9. A phenol terminated elastomer as in claim 7, in which the carboxyl terminated elastomer is heated with the diphenol in the presence of an acid catalyst.

References Cited

UNITED STATES PATENTS

| 3,135,716 | 6/1964 | Uraneck | 260—45.5 |
| 3,305,523 | 2/1967 | Burnside | 260—46.5 |

JOSEPH L. SCHOFER, Primary Examiner

C. A. HENDERSON, Jr., Assistant Examiner

U.S. Cl. X.R.

260—47 EC, 77.5 CR, 837 R

UNITED STATES PATENT OFFICE
CERTIFICATE OF CORRECTION

Patent No. 3,770,698　　　　　　　　　Dated November 6, 1973

Inventor(s) Changkiu K. Riew

It is certified that error appears in the above-identified patent and that said Letters Patent are hereby corrected as shown below:

Column 1, line 54, "hydroxy" should read ---hydroxyl---.

Column 3, line 18, "extermely" should read ---extremely---.

Column 3, line 45, "epox" should read ---epoxy---.

Signed and sealed this 23rd day of July 1974.

(SEAL)
Attest:

McCOY M. GIBSON, JR.　　　　　　　　C. MARSHALL DANN
Attesting Officer　　　　　　　　　　Commissioner of Patents